United States Patent Office 2,970,014
Patented Jan. 31, 1961

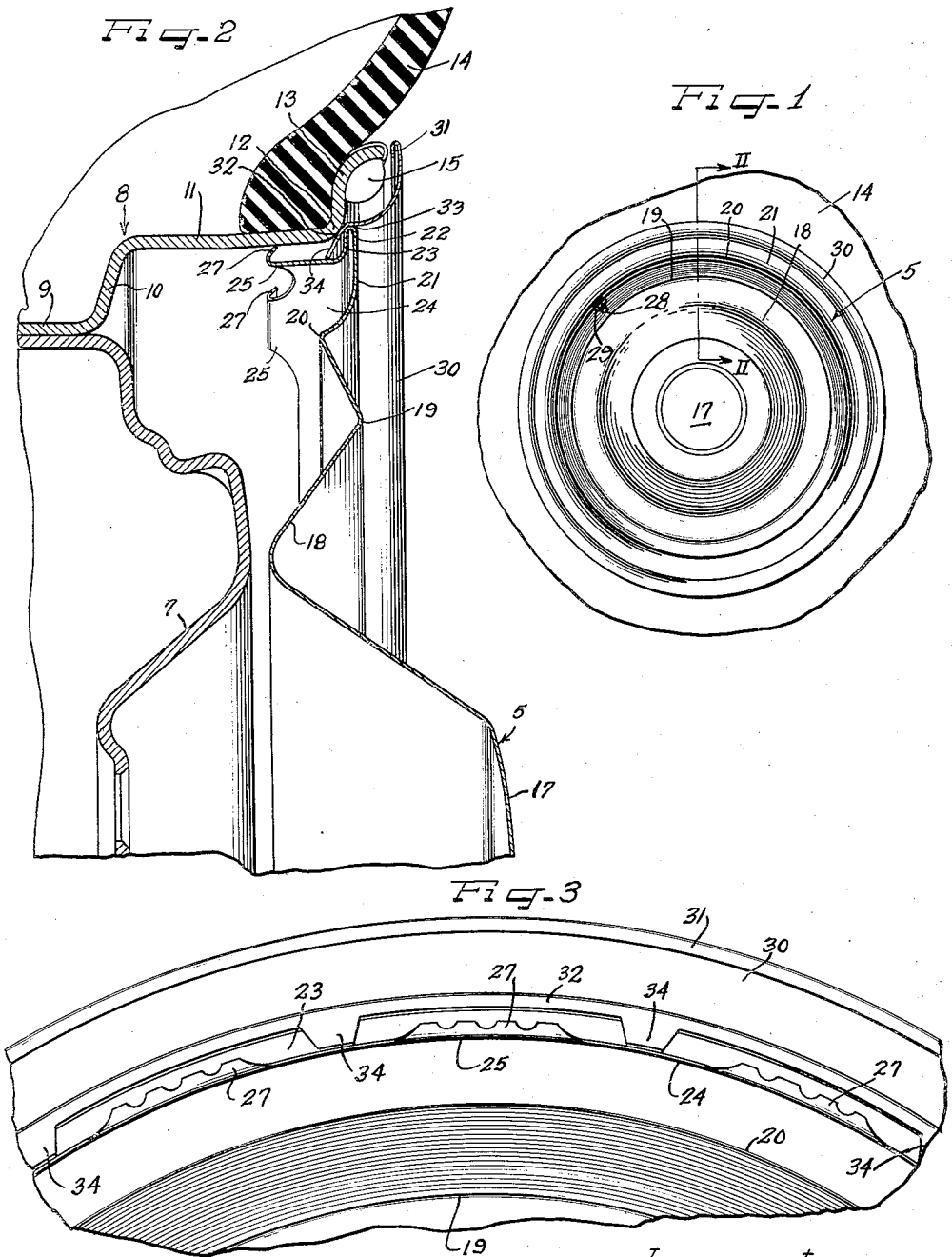

2,970,014

WHEEL COVER

George Albert Lyon, 13881 W. Chicago Blvd.,
Detroit 28, Mich.

Filed Nov. 22, 1957, Ser. No. 698,216

2 Claims. (Cl. 301—37)

The present invention relates to improvements in wheel structures and more particularly concerns the ornamental and protective covering of the outer sides of vehicle wheels.

Some wheel covers are made to overlie the wheel body and tire rim of a vehicle wheel with the edge of the cover overlying and abutting the inner portion of the terminal flange, while the outer portion of the terminal flange is left exposed, inclusive of any balancing weights that may be carried by the lip of the terminal flange. Optionally, it may be desirable to cover over the terminal flange of the tire rim for thereby concealing the generally severely contrasting finish of the tire rim compared to the appearance of the tire sidewall and the finish of the cover.

It is accordingly an important object of the present invention to provide improved means optionally usable with a wheel cover to afford the appearance of the wheel cover being of increased diameter.

Another object of the invention is to provide a supplemental trim ring structure for wheel covers.

A further object of the invention is to provide a novel extension device for vehicle wheel covers.

Still another object of the invention is to provide novel means for disposition between the edge of a wheel cover and a tire sidewall and arranged to be held in place by the cover with which associated.

Other objects, features and advantages of the present invention will be readily apparent from the following detailed description of a preferred embodiment thereof taken in conjunction with the accompanying drawing, wherein:

Figure 1 is an outer side elevational view of a vehicle wheel structure embodying features of the invention;

Figure 2 is an enlarged fragmentary radial sectional detailed view taken substantially on the line II—II of Figure 1; and Figure 3 is a fragmentary rear elevational view of the cover and trim ring assembly of Figure 2.

A wheel cover 5 is adapted to be applied in press-on, pry-off relation over the outer side of a vehicle wheel including a disk spider wheel body 7 supporting a multiflange, drop-center tire rim 8. From a base flange 9 attached to the outer marginal attachment flange of the wheel body, the tire rim 8 has extending generally radially outwardly a side flange 10 merging with a generally axially outwardly extending intermediate flange 11 joined on an annular rounded juncture shoulder 12 to a terminal flange 13 which projects generally radially and then axially outwardly. A pneumatic tire 14 is adapted to be supported by tire rim. Wheel balancing weights 15 may be mounted on the terminal flange 13.

While in the present instance the cover 5 is shown as a full disk cover, that is a single cover plate for overlying not only the wheel body 7, but also substantially overlying the tire rim 8, it will be appreciated that where preferred the cover 5 may be in the form of an annulus overlying the tire rim and the adjacent portion of the wheel body, while a central hub cap may be utilized over the wheel body central portion. In any event, the wheel cover 5 is adapted to be made from suitable metallic sheet or strip material such as stainless steel, brass and the like.

Centrally the cover 5 has a crown portion 17 about which is an intermediate generally axially inwardly dished annular portion 18 provided with a radially outer rib 19 that projects axially outwardly and has at the radial outer side thereof an indented annular reenforcing rib 20. At its radially outer margin, the cover has an annular marginal portion 21 for overlying the tire rim 8 and provided with a turned reenforcing and finishing edge 22, from which extends generally axially inwardly an underturned annular flange 23. Herein the edge 22 extends to a diameter for overlying the tire rim shoulder 12.

From the inner margin of the underturned flange 23 extends generally axially inwardly a continuous annular flange 24 of a diameter to telescope in adjacent space relation within the axially outer portion of the intermediate flange 11 of the tire rim. For retaining the cover on the wheel, the flange 24 is provided with a plurality of short axially inward resilient retaining finger extensions 25 having short and stiff generally radially and axially outwardly oblique retaining terminals 27 which are normally disposed on a diameter slightly greater than the diameter of the axially outer portion of the intermediate flange 11 of the tire rim, but are adapted to be resiliently deflected by flexure of the retaining fingers 25 and the adjacent portions of the flange 24 radially inwardly, for thereby affording tensioned cover retaining thrust of the retaining terminals 27 against the engaged portion of the intermediate flange.

When the cover 5 is applied to the outer side of the wheel, a valve stem 28 projecting from the side flange 10 on the tire rim is registered through a valve stem aperture 29 in the cover, as shown in Figure 1. In such applied condition of the cover 5, the edge 22 is drawn towards the rim shoulder 12 and held in such position by the retaining fingers 25 as engaged with the tire rim, and with the edge 22 clear of the wheel balancing weights 15.

While the cover 5 may be applied to the outer side of the wheel with the terminal flange 13 substantially exposed radially outwardly beyond the cover edge 22, means are provided herein for optional assembly with the cover 5 for concealingly overlying the tire end terminal flange 13 and the wheel balancing weights 15, and to afford the appearance of the cover extending entirely to the sidewall of the tire 14. To this end, a trim ring member 30 is preferably provided which is of a diameter to overlie at its radially outer turned edge 31 the tip of the terminal flange 13. Radially inwardly from the turned edge 31, the ring member 30 is curved generally radially and axially inwardly over the terminal flange 13 and the wheel balancing weight 15 an inner radially inwardly angled annular continuous marginal flange 32 providing an abutment shoulder for bottoming or seating against the tire rim shoulder 12 under the edge 22 of the wheel cover in substantially clamped interengagement between the cover edge and the rim shoulder. A centered relationship on the wheel and concentric relationship with respect to the cover 5 is maintained by the cover edge 22 seating in a reentrant groove 33 provided at the juncture of the flange 32 with the generally axially outwardly extending adjacent marginal portion of the trim ring member 30.

In a preferred form, the ring member 30 is made from suitable thin gauge metal such as stainless steel, brass, aluminum, and the like, which may be rolled to shape from strip stock. Similar or contrasting finish on the ring 30 with respect to the cover 5 may be provided. For example, the finish may be a polished and plated surface, or it may be some other surface treatment, such as painting, white being desirable to afford a white tire sidewall effect.

In order to enable handling of the wheel cover 5 and the ring member 30 as a unit before assembly with the wheel or after removal from the wheel, the turned inner marginal flange 32 of the ring member 30 is preferably provided with means for retaining engagement with the axial cover flange 24. In the present instant the retaining means comprise a suitable circumferentially spaced series of generally radially and axially inwardly extending oblique retaining fingers 34 having the biting tips thereof normally projecting to a smaller diameter than the outside diameter of the annular flange 24. Hence, by effecting relative axial assembly of the ring and cover members, the retaining fingers 34 will be tensionably slightly radially outwardly deflected so that the biting tips will thrust in firm retaining biting engagement against the opposing radially outer surface of the cover flange 24. As may be best observed in Figure 3, the retaining fingers 34 are properly spaced apart to be received between the retaining fingers 25 so that on assembly with the cover, the fingers 34 will clear between the retaining finger terminals 27.

Since the retaining fingers 34 need maintain retaining engagement with the cover flange 24 only to maintain the assembly together while off the wheel and the ring member 30 is effective clamped against the wheel in the mounted relationship to the wheel, the retaining fingers 34 need not be especially massive or of unusually strong retaining resilience or stiffness, but may be relatively narrow as depicted. In this manner, moreover the retaining fingers 34 avoid interfering with the resilient functioning of the cover retaining flange 24 and retaining fingers 25.

By preference, the trim ring member 30 is assembled with the cover 5 before the assembly is applied to the outer side of the wheel. Then, the cover with the ring member 30 assembled therewith is applied to the outer side of the wheel and the cover pressed firmly home to clamp the flanged inner margin of the ring member 30 against the tire rim.

Removal of the wheel and ring assembly from the outer side of the wheel is easily effected by application of a pry-off tool behind the ring member 30, inserting the same into the gap between its outer margin and the tire rim terminal flange 13 and application of pry-off tool force behind the reenforcing rib provided at the juncture of the inner margin of flange 32 with the body of the ring member 30. Application of axially outward pry-off force to the inner margin of the ring member, also imposes such force to the overlying edge 22 of the cover, for thereby sliding the adjacent retaining fingers 25 and more particularly the terminals 27 thereof from the retained engagement with intermediate flange of the tire rim.

It will be understood that modifications and variations may be effected without departing from the scope of the novel concepts of the present invention.

I claim as my invention:

1. In a cover and trim ring assembly, a sheet metal cover member having an outer margin with an underturned radially inwardly extending flange having an axially inwardly extending substantially straight portion with a plurality of circumferentially spaced cover retaining fingers with outwardly angled retaining terminals, and a trim ring member assembled with the margin of the cover and having a plurality of generally radially inwardly angled narrow retaining fingers having biting edges engageable with the axially extending flange portion and the ring member fingers being spaced apart substantially equivalent to the spacing of the retaining fingers of the cover but being substantially narrower than the spacing between said cover fingers so as to be movable into assembly with the cover flange by relative axial movement with the retaining fingers of the ring located between the retaining fingers of the cover.

2. In a cover and trim ring assembly, a sheet metal cover member having an outer margin with an underturned radially inwardly extending flange having an axially inwardly extending substantially straight portion with a plurality of circumferentially spaced cover retaining fingers with outwardly angled retaining terminals and the substantially straight portion and retaining fingers functioning resiliently for press-on, pry-off interengagement with a tire rim flange, and a trim ring member assembled with the margin of the cover and having a plurality of generally radially inwardly angled retaining fingers which are substantially narrower than the cover fingers and substantially spaced apart, said ring fingers having inner terminal edges which engage the axially extending flange portion to retain the cover member and ring member in assembled relation, the ring member and the cover member being movable into assembled relation by relative axial movement wherein said ring fingers are moved axially past the cover fingers and toward the cover outer margin.

References Cited in the file of this patent
UNITED STATES PATENTS

| | | |
|---|---|---|
| 2,386,235 | Lyon | Oct. 9, 1945 |
| 2,413,328 | Lyon | Dec. 31, 1946 |
| 2,421,384 | Lyon | June 3, 1947 |
| 2,422,689 | Lyon | June 24, 1947 |

FOREIGN PATENTS

| | | |
|---|---|---|
| 1,061,278 | France | Nov. 23, 1953 |
| 532,572 | Canada | Nov. 6, 1956 |